Oct. 16, 1962 D. LEBELL 3,059,064

DATA CONVERTER

Filed Aug. 10, 1959 6 Sheets-Sheet 1

INVENTOR:
Don Lebell
By Smyth & Roston
Attorneys

INVENTOR:
Don Lebell
By Smyth & Roston
Attorneys.

INVENTOR:
Don Lebell
By Smyth & Roston
Attorneys

DIFFERENT TRANSPARENT COLOR BANDS.

INVENTOR:
Don Lebell
By Smyth & Roston
Attorneys.

Oct. 16, 1962 D. LEBELL 3,059,064

DATA CONVERTER

Filed Aug. 10, 1959 6 Sheets-Sheet 5

INVENTOR:
Don Lebell
By Smyth & Roston
Attorneys.

INVENTOR:
Don Lebell
By Smyth, Roston & Pavitt
Attorneys.

3,059,064

DATA CONVERTER

Don Lebell, Sherman Oaks, Calif., assignor to Don Lebell Associates, Sherman Oaks, Calif., a corporation of California Filed Aug. 10, 1959, Ser. No. 832,528
18 Claims. (Cl. 179—100.3)

This invention relates to a data converter and more particularly to apparatus for converting visible information such as a printed text to audible speech, or photographs to audio signals. The invention has particular application, for example, for communication with blind, illiterate or sick people.

In existing apparatus for reading printed information, the printed text is standardized in that special symbols, spacings and dimensions must be utilized. In these apparatus, the standardized text is scanned and converted to selected combinations of tones which represent successive symbols to listener. The symbols are either phonetics or letters of the alphabet. The listener must learn language represented by the combination of tones in order to understand the converted audible information. Because each successive symbol must be converted to a combination of tones recognizable by the listener, the number of possible combinations is limited and the reading speed of the printed text is slow. In such apparatus, the conversion of the printed information to audible signals which can be understood by the listener is therefore at speeds which are much slower than usual rates of speech.

In a specific illustrative embodiment of this invention any printed text may be read and converted to audible speech. The output audible signals are in the form of speech quite similar to the audible speech provided by an individual reading the printed text out loud.

The reading apparatus includes a word dictionary which is utilized to identify the successively scanned words of the printed text. The word dictionary, which is in the form of a cylindrical member, corresponds to the particular printed text being read. For a different printed text including, for example, different kinds of symbols and words, a different word dictionary is utilized. The word dictionary is readily removed from the reading apparatus so that different printed texts, including different symbols, dimensions of the words and spaces between words and between lines, etc. may be read.

The cylindrical word dictionary consists of a mosaic of optical filters and associated transparent sound tracks. Each unit consisting of an optical filter and a sound track corresponds to one word or phrase of the dictionary. It is an important feature of this invention to provide means for converting words and phrases of the printed text instead of phonetics or symbols. The conversion of a relatively large number of different words and phrases is possible because each conversion unit consisting of an optical filter and a sound track occupies a very small area of the surface of the dictionary cylinder. Illustratively, a 9,000 words cylindrical dictionary may have a 15 inch diameter and a 20 inch length. During the scanning of a word in the text, the dictionary is positioned to provide scanning access to the optical filters, and when a word has been identified the dictionary is positioned to provide access to the sound tracks.

The printed text is scanned printed line by printed line by a ribbon beam provided from an adjustable optical system in synchronism with means which scan the optical filters of the word dictionary. The ribbon beam consists of a color spectrum with the successive strips or bands of the beam being different colors. In this manner, as the ribbon beam is moved along a printed line of the text consisting of words and phrases, the different transverse positions of the words and phrases across the printed line are scanned by different colors of the beam. The color spectrum beam is, therefore, modulated by the printed text with each color band being differently modulated for each word or phrase.

The modulated color beam is introduced to a light pipe which diffuses the various colors in the beam and couples the composite diffused light to each optical filter of the word dictionary. The surface of the light pipe, which is positioned inside the word dictionary, consists of alternate opaque and transparent longitudinal slots so that either the optical filters or the sound tracks may be positioned adjacent the transparent slots. The arrangement, including the light pipe and the word dictionary, also includes two other cylindrical members which are concentrically mounted with the light pipe and the word dictionary. Positioned adjacent to the word dictionary is an axially movable scan cylinder which has a plurality of cylindrical slits. The scan cylinder is the scanning means mentioned above that is synchronized with the color spectrum beam from the adjustable optical system. As the scan cylinder is moved axially, successive portions of each of the optical filters transmit light from the light pipe through the cylindrical slits of the scan cylinder. The outer cylinder of the concentric arrangement functions as a word address register and has an internal phosphor coating or other light sensitive coating to which the light through the cylindrical slits of the scan cylinder is provided. The outer cylinder may be movable with the scan cylinder so that the light successively provided through each of the optical filters is accumulated at spots on the phosphor coating.

Each of the optical filters consists of a unique arrangement of color lines which corresponds to the successive color intensities in the light pipe for a particular word or phrase. Some of the color light from the light pipe is coupled through each of the optical filters to the phosphor surface with the total amount of light depending upon the match between the color filter and the color signal for the word or phrase being scanned. In this manner, the four-cylinder concentric arrangement functions as a word address system with the particular word which is read being identified and registered by the brightest spot on the phosphor surface of the outer cylinder.

Other features of this invention relate to the provision of means for recognizing a space between words and for reading the sound track associated with the identified word. When a space is recognized, the word dictionary is rotated to position the sound tracks instead of the optical filters for a scanning sequence by the scan cylinder. With the dictionary cylinder being positioned in this manner for a read-out sequence, the scan cylinder is slowly returned to its starting position and the light from the spots on the phosphor coating on the outer cylinder is coupled through the scanning slits of the scan cylinder to the sound tracks on the word dictionary. The sound tracks moduate the light from the scanning slits and introduce the modulated light to the light pipe. The light in the light pipe, therefore, now consists of many different modulated light signals with the light signal of the greatest intensity being that corresponding to the identified word.

The modulated light signal from the light pipe are coupled to a photo-multiplier which translates the light signals to electrical signals and introduces them to a threshold amplifier. The threshold amplifier responds only to signals over a predetermined threshold level set at a value to select the signals corresponding to the identified word. The selected signals are introduced from the amplifier to an electro-magnetic speaker for conversion to sound.

In the event a particular word being read is not included in the word dictionary, a distorted or incorrect sound is not provided because none of the electrical waves to the threshold amplifier will exceed the threshold level.

When the space between words is recognized, the scanning sequence of the printed matter is halted until the read-out sequence is completed. During the scanning sequence, the electrical signals to the speaker are inhibited, and during the read-out sequence the color spectrum beam is blanked. After the first space following a word, succeeding spaces before the next word are scanned at the normal rate without halting the scanning sequence.

In another embodiment of this invention, the scanning sequence of the printed text is not halted during a printed line scan. The scanning speed is continuous at a rate corresponding to speech. The scan cylinder reads the identified sound track during the time that the space following the word is being scanned by the color spectrum beam. The frequencies of the waves generated by the sound track are higher by a predetermined multiple than the desired frequencies of the spoken word because of the greater scanning speed of the scan cylinder during the read-out sequence. Means are provided by storing the signals provided through the photo-multiplier and the threshold amplifier such as on a continuous magnetic recording medium and then for reproducing them at a relatively slow rate to expand them over a longer interval and correspondingly reduce their frequencies. The reduced frequency signals are converted to speech by the electromagnetic speaker.

Other features of this invention relate to a further embodiment of this invention wherein light modulated in accordance with different flicker frequencies is utilized instead of the different color bands of the color spectrum for scanning the printed matter.

Still further features of this invention pertain to the provision of a print reader which scans the printed text and successively provides output signals representing two numbers as an address for each scanned word. An enunciator accepts the information in the form of the word address and converts it to audible speech. When the two number word address is provided only a single signal is provided from the word dictionary so that threshold responsive apparatus is unnecessary.

Further advantages and features of this invention will become apparent upon consideration of the following description when read in conjunction with the drawing wherein:

FIGURES 1 and 2, with FIGURE 2 arranged to the right of FIGURE 1, are a functional representation of one embodiment of the photo-electric reading apparatus of this invention utilizing a color spectrum scanning beam;

Figure 1:
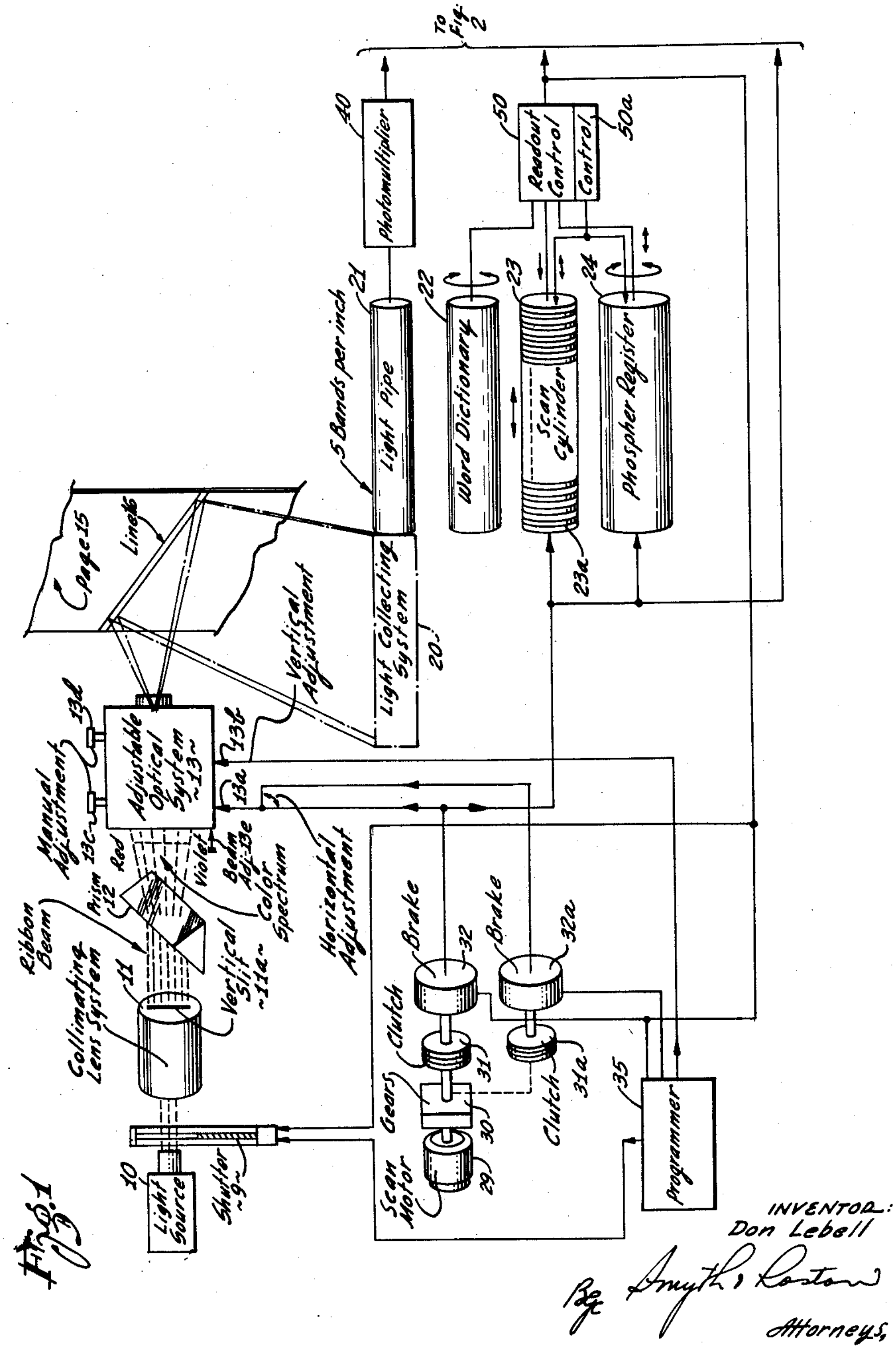
Figure 2:
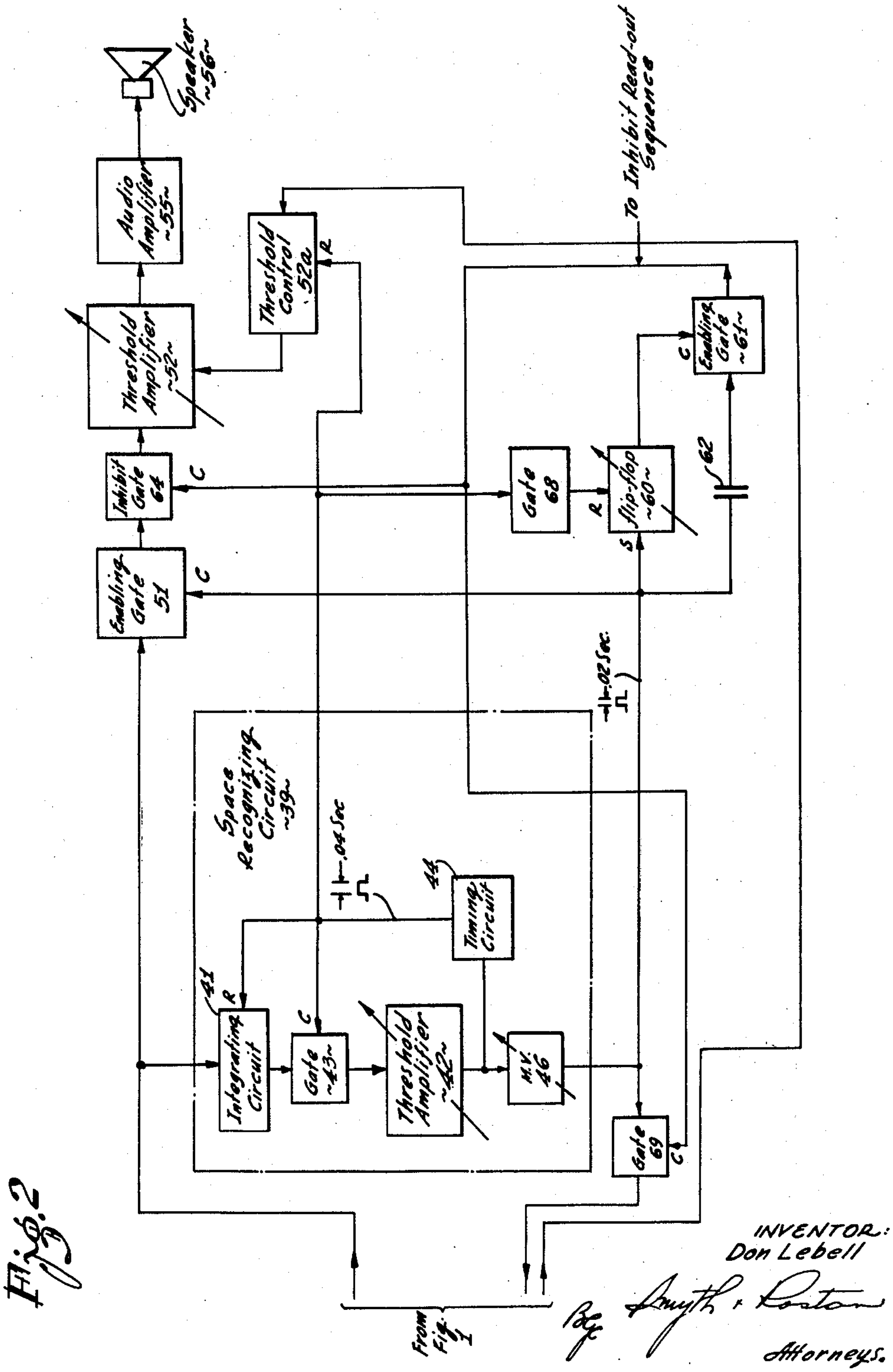
Figure 7:
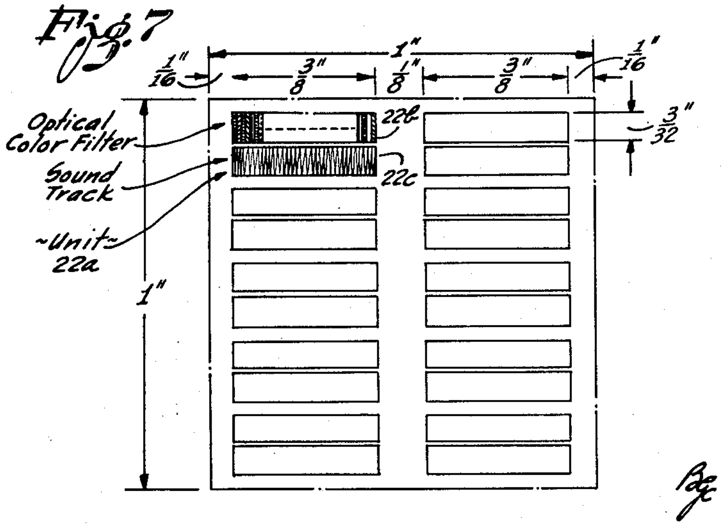
FIGURE 7 is an enlarged view of one square inch of the optical mosaic on the surface of the cylindrical word dictionary.
Figure 7A:
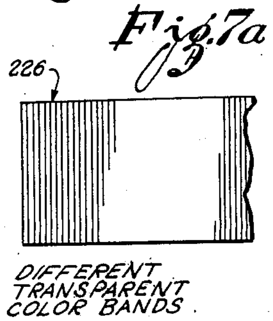
Figure 8:
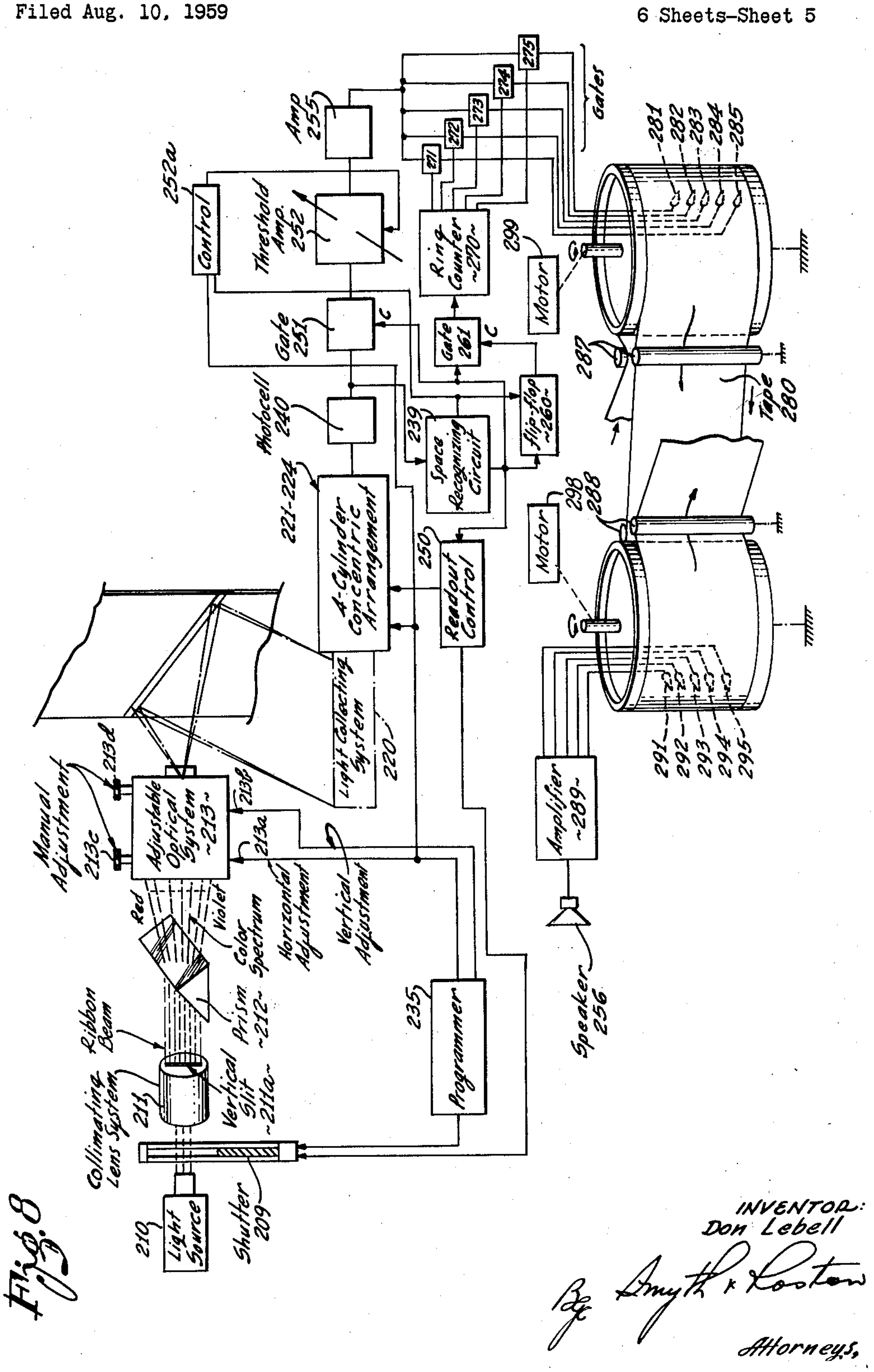
Figure 9:
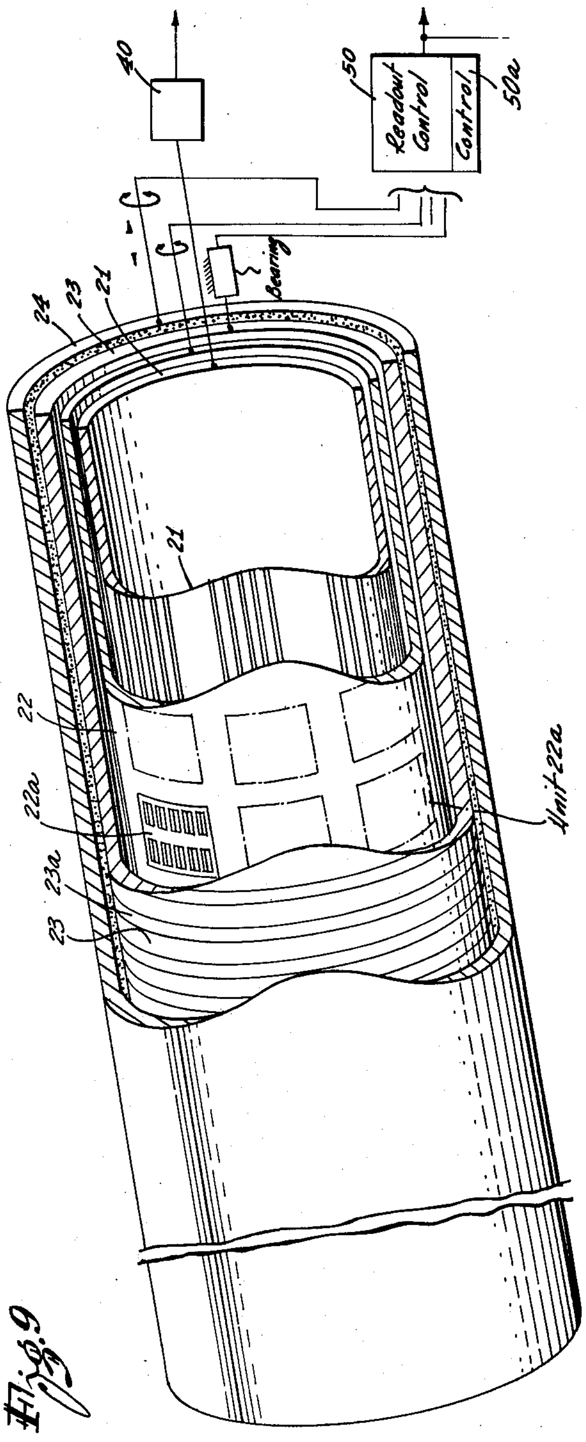

FIGURE 7*a* is a greatly enlarged view of a portion of one optical filter of the word dictionary;

FIGURE 8 is a functional representation of a fourth embodiment of this invention in which the scanning rate of words and spaces of the printed text is continuous; and FIGURE 9 is a pictorial view illustrating the concentric arrangement of the cylinders of the one embodiment of FIGURES 1 and 2.

Referring first to FIGURES 1 and 2, with FIGURE 2 arranged to the right of FIGURE 1, a source 10 provides a beam of white light through a shutter 9 to a columnating lens system 11. The shutter 9 is a two-position device which is controlled, as is hereinafter described, by a space recognizing circuit 39 in FIGURE 2 and also by a programmer 35 in FIGURE 1. The columnating lens system 11 has a vertical slit **11*a* through which a ribbon beam of white light is provided to a prism 12. The prism 12 disperses the light, separating it into a color spectrum beam from red to violet in a conventional manner and provides the color spectrum beam to an adjustable optical system 13. The beam from the prism 12** is in the form of a vertically aligned ribbon of colors with red being at one edge of the ribbon and violet being at the other edge.

The adjustable optical system 13 may consist essentially of a plurality of mirrors, not shown, one of which is rotatable to deflect the color spectrum beam at different horizontal angles to a printed page 15 and the other of which is rotatable to deflect the color spectrum beam at different vertical angles to the page 15. Such systems are conventional in the art and are illustrated by the Scophony apparatus described on pages 40, 41 and 620 of a book, "Elements of Television Systems," written by George E. Anner, and published by the Prentice-Hall Inc. of Englewood, New Jersey. The optical system 13 includes two automatic adjustment controls **13*a* and 13*b* and two manual controls 13*c* and 13*d*. The automatic control 13*a* and the manual control 13*c* determine the horizontal position of the color spectrum beam on the page 15 and the automatic control 13*b* and the manual control 13*d* determine its vertical position. The manual adjusting controls 13*c* and 13*d* may, therefore, be set to position the color beam at the left or beginning of a printed line 16 on the printed page 15**.

Tht photoelectric reading equipment of this invention may be utilized with any kind of print or type conventionally utilized for books or other printed matter. The photoelectric reading equipment includes a word dictionary 22 which is changed when different kinds of printed matter are utilized. In other words, for one kind of printed matter, one word dictionary is used, and for another kind of printed matter, a different dictionary is utilized. Assume for the purposes of this description that the printed matter which is to be read is in the form of printed pages each having approximately 30 lines, such as the line 16, and each of the lines including approximately 10 words with the average word having five letters of the alphabet. These assumptions would be fairly typical for many books and printed matter utilized in the United States.

In order to read the printed page 15 and provide audible signals representing the voice of an individual reading the printed matter, a reading rate illustratively of approximately 100 words per minute is utilized. Though the photoelectric reading equipment is described in reference to this reading rate, any other reading rate may be utilized. With 10 words per line, and a reading rate of 100 words per minute, one line is read in 0.1 minute or 6 seconds. After the adjustable optical system 13 has been manually set to illuminate the beginning of a line 16 on the page 15, it is automatically moved along the line 16 from the left to the right of the page 15 at an average speed of 100 words per minute. At the end of six seconds, the color spectrum ribbon of light is at the end of the line 16 at the right of the page 15.

Figure 6:
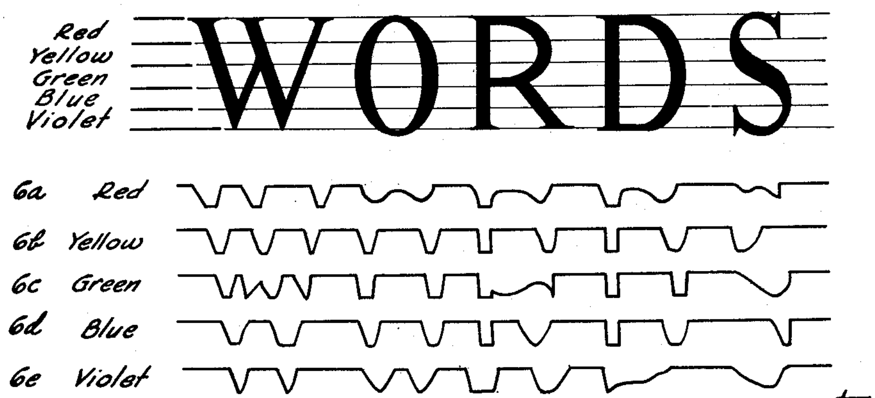
FIGURE 6 is a series of curves illustrating the modulation of the color spectrum beam by a word in the printed text.

The height of the color spectrum beam is slightly larger than the height of the words in the printed line to permit a slight misalignment of the beam with respect to the printed line. In FIGURE 6, which illustrates the modulation of the color spectrum beam by a printed word, a spectrum beam from the system 13 has a height which is the same as the height of the printed word. The adjustable optical system 13 in FIGURE 1 includes a manual control 13*e* for adjusting the height of the beam from the system 13 so that either a slightly larger height or the same height beam may be utilized. The height of the beam may also be adjusted for a different printed text. As the color spectrum beam is swept from the left to the right across a word in the line 16, the light is successively modulated in accordance with each printed word. The different colors of the color spectrum beam from the optical system 13 are each modulated by different amounts by each printed word.

In FIGURE 6, the color spectrum beam is illustrated as having five color bands; red, yellow, green, blue and violet. Actually, the color spectrum may consist of any number of bands as provided from the prism 12, and the bands need not be of equal height. The accuracy of the system is increased by utilizing more color bands. The utilization of five color bands is, therefore, merely illustrative with a particular band arrangement being assumed merely to facilitate an understanding of the operation of the invention.

Referring to FIGURE 6, each of the five color bands is modulated differently as it is moved across the printed word. In FIGURE 6, the curves 6*a* through 6*e* illustrate the modulation of each of the five color bands by the printed word "WORDS" as the color spectrum beam is scanned across it. The five color bands move across successive vertical positions of the word with the red band moving along the top of each of the letters and the violet band moving along the bottom of each of the letters. For the black letter "w" on a white background, the reflected red band is at a maximum intensity until the band reaches the left arm of the letter "w." Due to the angular disposition of the left arm of the letter "w," the intensity of the reflected red band decreases before the intensity of the reflected violet band decreases. The violet band is swept adjacent the bottom portion of th left arm of the letter "w." For a color in the middle of the color spectrum such as, for example, green, the band is interrupted a number of times as it sweeps across the successive black portions of the central portion of the letter "w". In a similar manner, each of the letters of the alphabet provides for a unique color spectrum modulation. The intensities of the various reflected color bands from the line 16, therefore, vary in time in accordance with the printed matter in the line 16.

Referring again to FIGURES 1 and 2, the color spectrum beam is moved along the line 16 on the page 15 under control of a scan motor 29 which automatically adjusts the horizontal adjustment control 13*a* of the optical system 13. The scanning motor 29 operates a gear train 30 which, in turn, drives the horizontal control 13*a* through a clutch 31 and a brake 32. When the brake 32 is operated, the scan motor 29 continues to rotate but the control 13*a* halts the color spectrum beam from the optical system 13 on the line 16.

The reflected and modulated color spectrum beam from the line 16 is provided to an optical light collecting system 20 which collects the reflected light from any part of the page 15. The modulated light from the first scanned word in the line 16 is provided from the light collecting system 20 to a light pipe 21 which distributes the light uniformly over its cylindrical surface. The light pipe 21 may be a cylindrical Lucite rod having a relatively rough surface for dispersing the light received from the collecting system 20. The rough surface of the pipe 21 consists of alternate opaque and transparent longitudinal slits. The alternate transparent slits may be provided by painting the surface black and then scratching or removing the black paint along longitudinal lines to provide transparent slits. The width of each transparent slit may illustratively be 3/32 of an inch.

The composite modulated colors from the collecting system 20 is distributed over the cylindrical surface of the light pipe 21 and coupled therefrom through the transparent slits of the pipe 21 to the word dictionary 22 which was briefly mentioned above. The word dictionary 22 is cylindrically shaped and is somewhat larger than the light pipe 21 and concentric therewith. In FIGURE 1, the light pipe 21 and the word dictionary 22 are not shown concentric in order to more clearly describe their operation. In FIGURE 9 the pipe 21 and the dictionary 22 are shown concentric. The units 22*a*, the slots 23*a*, etc., are shown enlarged to more readily illustrate the operation. In addition to the light pipe 21 and the word dictionary 22, two other cylindrical members are concentrically mounted: a scan cylinder 23 and a phosphor register 24, both of which are hereinafter described in detail.

The word dictionary 22 is rotatable, having two angular positions with respect to the light pipe 21. During the time that the optical system 12 is scanning a word of the line 16, the word dictionary 22 is in its first angular position, and when the beam from the optical system 13 is halted, the word dictionary 22 is rotated to its second position. The word dictionary 22 consists of a mosaic of optical filter areas or units 22*a* each of which corresponds to one word or phrase of the dictionary. As indicated above, the dictionary 22 is unique with respect to the printed text which is being read. FIGURE 7 illustrates the arrangement of the filter units 22*a* in one square inch of the surface of the word dictionary 22, and FIGURE 7*a* illustrates an enlarged portion of one optical filter. As illustrated in FIGURE 7, the word dictionary 22 may provide for 10 words for each square inch of its surface. Illustratively, the word dictionary 22 may be fifteen inches in diameter and 20 inches long having a cylindrical surface of approximately 940 square inches so that the word dictionary may readily include 9,000 words with 10 elemental word areas 22*a* being provided for each square inch.

Each elemental area 22*a* consists of an optical color filter 22*b* and an optical sound track 22*c*. The optical filters 22*a* are utilized during the scanning sequence to recognize the word being scanned and the sound tracks 22*c* are utilized to provide an audio representation of the word as spoken. The optical filters 22*b* are, therefore, a word address or word identifying means and the sound tracks 22*c* are part of a play-back or read-out means. When the word dictionary 22 is positioned in its first position, the light through the transparent slits of the pipe 21 passes through the optical filters 22*b* of each of the elemental areas 22*a* but not through the sound tracks 22*c*. When the word dictionary 22 is rotated to its second position, the converse conditions exist with light being provided through the sound tracks 22*c* but not through the optical filters 22*b*. The height of each of the filters 22*b* and the tracks 22*c* may be 3/32 of an inch or equal to the width of the transparent slits of the light pipe 21. During the word address identification sequence, light to the sound tracks 22*c* is blocked by the opaque areas of the light pipe 21. The light, therefore, in the light pipe 21 in FIGURE 1 is provided through each of the light filters 22*b* of the 9,000 elemental areas 22*a* on the word dictionary 22, but not through any of the 9,000 sound tracks 22*c*. Each of the 9,000 optical color filters 22*b* are different, having a different combination of vertical color bands somewhat resembling the appearance of light from the diffraction grating in the spectroscope.

The scan cylinder 23, which is positioned over the word dictionary 22, is opaque except for a series of transparent narrow cylindrical slits 23*a* shown with enlarged widths in FIGURE 1. The scan cylinder 23 is synchronized with the color spectrum beam from the optical system 13 and moves to the right under control of the motor 29 at a predetermined speed during the time that the color beam is moving to the right along the line 16 of the page 15. The scan cylinder 23 may include a speed reduction system, not shown, so that its axial speed is slower than the speed of the beam along the line 16. Each of the slits 23*a* may have a width of approximately 0.01 inch so that as the scan cylinder moves to the right, the slits 23*a* are moved along the optical filters 22*b* of the word dictionary 22. There is one slit 23*a* for each of the columns of elemental word areas 22*a* on the dictionary 22. With the word dictionary 22 being 20 inches long and having, for example, 38 cylindrical columns of areas 22*a*, there are 38 transparent slits 23*a* in the scan cylinder 23.

As the slits 23*a* move along the various optical filters 22*b*, an amount of light passes through each of the optical filters 22*b* and through the transparent slits 23*a* which depends upon the correspondence between the transmission coefficients of the successive vertical areas in each of the optical filters 22*b* and the successive combinations of colors of the dispersed light in the light pipe 21. At any instant, when there is an exact match, in that a vertical area of an optical filter 22*b* adjacent a slit 23*a* exactly matches the color in light pipe 21, there is a maximum transmission of light intensity from the light pipe 21 through the vertical area of the optical filter 22*b* and the transparent slit 23*a*. The amount of light, therefore, which passes through the various optical filters 22*b* and the slits 23*a* at any particular instant varies from a maximum when there is an exact correspondence with the light in the pipe 21 to a minimum when the optical filter 22*b* is effectively opaque to the particular light at that instant.

As the scan cylinder 23 moves to the right, the slits 23*a* move across the optical filters 22*b* with each optical filter 22*b* transmitting for the successive positions of the slits 23*a* amounts of light determined by the instantaneous match between them and the color in the light pipe 21. The total illumination, therefore, through each of the transparent slits 23*a* varies for each of the optical filters 22*b*. The light through the slits 23*a* falls upon the internal cylindrical surface of a phosphor register 24 which is the outer cylinder of the four-cylinder concentric arrangement. The register is in the form of a phosphorous coating which temporarily stores the light provided thereto through the scan cylinder 23. The phosphor register 24 is synchronized with the scan cylinder 23 and in fact the two cylinders 23 and 24 may be a single composite cylinder because they need not be movable with respect to each other. When the beam from the optical system 13 has traversed a word, the scan cylinder 23, which is moved in synchronism therewith, provides for 9,000 light spots or registrations on the phosphor coating of the register 24. One light spot is provided on the register 24 for each of the 9,000 words in the dictionary at positions aligned with the optical filters 22*b* of the elemental word areas 22*a*. The particular elemental word area 22 which matches the word being scanned provides for a maximum total light intensity during the scanning of the optical filter 22*b* to the phosphor register 24. As each optical filter 22*b* is scanned by its associated slit 23*a* in the cylinder 23, the spot on the phosphor register 24 becomes progressively brighter to provide an indication of the total amount of light successively coupled through the slit 23*a*. The particular color arrangement in the bands of the optical filter 22*b* of the elemental area corresponding to the word being scanned, exactly matches the color variations in the light pipe 21 as the word is scanned by the optical system 13 so that a maximum amount of light is registered. The sequence for registering the light spots on the phosphor register 24 continues in this manner until a space is detected at the end of a word.

In addition to utilizing the light in the light pipe 21 to determine the word address, the light from the light pipe 21 is also provided to a photo-multiplier 40 which converts the light intensity to a varying electrical current. The electrical current, which varies in accordance with the variations of the light intensity, is provided to a space recognizing circuit 39. The space recognizing circuit 39 includes an integrating circuit 41 which provides an output signal proportional to the product of the magnitude and the duration of the signal received thereat. When a space between words is being scanned, the light provided to the photo-multiplier 40 is at a continuous constant maximum intensity because the scanned page 15 is white and the print thereon is black.

The scanning rate of the beam from the optical system may be 100 words per minute or each line 16 in 6 seconds. The average line 16 has 10 words and 10 spaces and the scanning rate of the words may be at 0.02 second for each letter or 0.1 second for the average five letter word, and the read-out sequence at the space following each word may have a duration of 0.5 second.

The scanning rate of the color beam from the optical system 13 is then approximately .02 second per letter during the scanning sequence. If any letter or symbol is provided during the space being scanned, the light intensity to the photo-multiplier 40 is interrupted no later than half way through the scanning space by the letter, which is after .01 second. For each letter in the English alphabet, for example, the light intensities would be interrupted sometime during the first half of each space. If the light intensity is not interrupted for an interval of 0.012 second, which is no longer than the duration for scanning half the space, the integrating circuit 41 provides a potential of sufficient magnitude through a gate 43 to operate a threshold amplifier 42. The magnitude sufficient to operate the threshold amplifier is attained when the space has been scanned for 0.012 second without interruption of the light intensity to the photo-multiplier 40 by a portion of a letter or symbol. In this manner, the amplifier 42 operates when a blank space is being scanned but not when any letter or symbol is being scanned.

The threshold amplifier 42 controls the operation of a multivibrator 46 and a timing circuit 44. If a letter is being scanned so that the threshold amplifier 42 does not operate at the end of the 0.012 second interval, the timing circuit 44 operates to inhibit the gate 43 to block the passage of the signal from the circuit 41 to the amplifier 42. The timing circuit 44 also resets the integrating circuit 41. The timing circuit 44 provides a pulse which has a duration of 0.008 second so that the integrating circuit 41 remains reset or discharged until the end of the 0.02 second interval for scanning a letter. The output of the timing circuit 44 is in this manner an indication that a symbol or letter is being scanned and not a blank space.

When a blank space is being scanned, however, the threshold amplifier 42 is operated to reset the timing circuit 44 and to trigger the multivibrator 46. The multivibrator 46 provides an output pulse having a duration of approximately 0.48 second to initiate a read-out sequence for converting the brightest spot on the phosphor register 24 to audio signals representing the scanned word of the area 22*a* associated therewith. More specifically, the multivibrator 46 performs the following functions when it is triggered by the threshold amplifier 42:

(1) It operates the brake 32 to halt the horizontal movement of the beam by the optical system 13 and the axial movement to the right of the scan cylinder 23 and the phosphor register 24;

(2) It operates the shutter 9 to block the passage of the white light from the source 10 so that reflected light is not coupled from the scanned line 16 to the light pipe 21;

(3) It enables a gate 51 to enable the passage of audio signals to a speaker 56;

(4) It operates a flip-flop circuit 60 to ready the system for recognizing any succeeding blank spaces immediately following the space during which the read-out sequence is taking place; and (5) It operates a read-out control arrangement 50 which controls the movement of the four concentric cylinder arrangement.

The operating potential for the control arrangement 50 and the shutter 90 and brake 32 as well, is provided from the multivibrator 46 through a normally enabled gate 69. The read-out control 50 provides for the following operating sequence:

(*a*) It rotates the word dictionary 22 one step in a clockwise direction, when viewed from the right in FIGURE 1, to position the sound tracks **22*c* instead of the optical filter 22*b* adjacent the transparent slits of the light pipe 21**;

(*b*) It initiates the slow return movement of the scan cylinder **23*a* and the phosphor register 24 to the left to scan the sound tracks 22*c***;

(*c*) After the read-out sequence is completed it rotates the phosphor register 24 and the scan cylinder 23 as well if they are affixed in a one step clockwise direction as viewed from the right in FIGURE 1 by an angular displacement equal to the angular movement of the word dictionary 22; and (*d*) After the read-out sequence, it also returns the word dictionary 22 to its original angular position to align the optical filters **22*b* with the transparent slits in the light pipe 21** so that the address of the next word can be determined.

During the time that the scan cylinder 23 is moved to the left to read out the word, light is provided respectively from the 9,000 different intensity light spots on the register 24 successively through the portions of the sound tracks **22*c* of the 9,000 elemental areas 22*a*. The sound modulated light from the sound track 22*c* associated with the brightest spot on the register 24 is, of course, of the largest intensity. The brightest modulated light is coupled to the light pipe 21 and represents audio signals corresponding to the word which was read. The modulated light in the light pipe 21 from all 9,000 sound tracks is coupled to the photomultiplier 40 which converts them to audio signals and introduces them to the gate 51**.

By not interrupting the scanning sequence of the printed line abruptly at the end of a word but toward the end of the space following the word, words with a similar beginning are readily identified. Consider the word "the" and the word "theater." For the first three letters the brightness or intensity of the two corresponding spots on the register 24 are identical. The modulated light reflected from the line 16 is not interrupted for the word "the" until 0.06 second of the space following the word have elapsed. During this 0.06 second interval, the two associated optical filters **22*b* couple different amounts of light to the register 24, with the intensity of the light from the optical filter 22*b* associated with the word "the" being greater than the light from the filter 22*b* associated with the word "theater." The reason for the greater transmitted amount of light is that the optical filter 22*b* for the word "the" has a color matching the color in the pipe 21 for an unmodulated color beam provided when a space is scanned. When the word "theater" is scanned, the letter "a" in the word theater modulates the beam during the 0.06 second interval so that the spot associated with the word "the" on the register 24** does not increase its brightness at the same rate as the spot associated with the word "theater."

As tabulated above, when the multivibrator 46 is operated to indicate that a space is recognized, it also enables the gate 51 so that the audio signals from the photo-multiplier 40 are coupled through the gate 51 and a normally enabled gate 64 to a threshold amplifier 52. The threshold amplifier 52, which is both manually and automatically adjustable, is set to respond to audio signals of a predetermined level and to reject the rest. The amplifier 52 responds only to the audio signals which represent the word that was read during the scanning sequence and identified by the brightest spot on the register 24. The threshold amplifier 52 is automatically set by a threshold control circuit **52*a* to a predetermined setting which depends upon the length of the scanned word of the printed text. The control circuit 52*a* is synchronized with the scan cylinder 23 and the register cylinder 24 providing an output potential which is proportional to the distance that the cylinders 23 and 24 are moved to the right. The control circuit 52*a*** may include a potentiometer or other means for converting the movement to a potential.

The reason for adjusting the threshold amplifier in accordance with the length of the word being scanned is because the brightness of the identifying spot on the register 24 varies with the length of the word; the longer the word, the brighter the spot. As is hereinafter described, the control circuit **52*a*** is automatically reset for a one letter word or symbol at the end of the read-out sequence.

The audio signals representing the identified word are coupled from the threshold amplifier 52 to an audio amplifier 55. The amplified audio signals from the audio amplifier 55 are coupled to a speaker 56 which converts them to audible signals for the listener.

When the multivibrator 46 returns to its normal condition, it recloses the gate 51 to block signals through the audio channel to the speaker 56, and it removes the braking signal from the brake 32 to re-institute the scanning sequence by the optical system 13. The shutter 9 is also returned to its normal condition so that the white light is provided from the source 10 to the columnating lens system 11.

In the event a number of spaces follow each other, such as are often provided between sentences or at the end of a paragraph, the scanning sequence of the spaces following the read-out space are not interrupted. In other words, the first space following the word is utilized to provide the read-out sequence, but the succeeding spaces are scanned without initiating a read-out sequence or halting the scanning beam.

When the multivibrator 46 operates to indicate that a space has been recognized by the circuit 39, in addition to initiating the read-out sequence, it also operates a flip-flop circuit 60. The circuit 60 is a bi-stable arrangement which remains in its set or reset condition unless triggered to the other. The circuit 60 is still in its set condition when the second or next succeeding blank space is recognized by the circuit 39. The circuit 60 enables a gate 61 to couple the succeeding pulse from the multivibrator 46 through a capacitor 62 and the gate 61 to the inhibiting gate 64 in the audio signal channel. The inhibiting gate 64 in the audio signal channel, blocks the passage of any signals coupled through the gate 51. The gate 61 also inhibits the initiation of a read-out sequence by inhibiting the gate 69 through which the control signal from the multivibrator 46 is provided to initiate the read-out sequence, and the cylinders 23 and 24 are returned to their scan starting positions to the left. The pulse from the gate 61 also operates a control arrangement **50*a* which is associated with the arrangement 50. The arrangement 50*a* moves the cylinders 23 and 24** back to the left.

As long as succeeding spaces are, therefore, being scanned, the scanning sequence continues in an uninterrupted manner with no audio output being provided to the speaker 56. When the next word is scanned, if it is a small word, the circuit 60 may still be operated when the space following the small word is scanned. The timing circuit 44, however, which responds during each space that includes a letter or symbol, resets the flip-flop circuit 60 to block the passage of the pulse from the multivibrator 46 to the inhibiting gates 64 and 69. The reset potential is coupled from the timing circuit 44 through a gate 68 which is inhibited by the multivibrator 46 during the read-out sequence. The timing circuit 44 also resets the control circuit **52*a* to ready the amplifier 52** for the next word.

At the end of a scanned line 16, the programmer 35 operates the brake 32 and releases a brake **32*a* to initiate the horizontal return of the beam to the left of the page, and it operates the vertical adjustment control 13*b*** of the optical system 13 to step the beam to the next line. During the return or flyback sequence, the programmer 35 operates the shutter 9 to block the passage of the light from the source 10.

The first space at the beginning of a line operates the space recognizing circuit 39 which initiates a read-out sequence. None of the signals, however, from the phosphor register 24 are of sufficient intensity to operate the threshold amplifier 52 so that audio signals are not provided to the speaker 56. The sequence continues in this manner as line after line is converted to audio signals until the bottom of the page is reached. Though not shown, the system may, of course, include means for counting the number of scanned lines and for halting the scanning sequence after a predetermined number of lines corresponding to a page have been counted.

In the embodiment shown in FIGURES 1 and 2, the scanning sequence is discontinuous for a printed line because it is halted for each read-out sequence at the spaces following the words in the line. In the embodiment of the invention shown in FIGURE 8, the scanning sequence is not halted as the line is scanned from one end at the left of the page to the other end at the right of the page. In FIGURE 8, many of the components are similar to components shown in FIGURES 1 and 2 and described above. The components which are similar have been given similar designation numbers with the addition of 200. For example, the light source 210 in FIGURE 8 is similar to the source 10 in FIGURE 1.

The light source 210 couples the white light through the shutter 209 and the columnating lens system 211 to the prism 212. The color spectrum ribbon from the prism 212 is coupled through the adjustable optical system 213 to scan the line 216 on the page 215. The programmer 235 controls the optical system 213 to move the scanning beam at a constant rate along the line 216 of the page 215. Illustratively, in order to provide the output audible signals at a rate of 100 words per minute, each of the printed lines is scanned in six seconds. Each of the printed lines may have a total of 60 printed and blank spaces so that each is scanned in 0.1 second. The reflected modulated light from the line 16 is coupled to the collector system 220 and introduced to the 4 cylinder concentric arrangement including the cylinders 221 through 224, inclusive.

The concentric arrangement functions in a manner similar to that described above for determining the address of the scanned word on tthe word dictionary 222. A photocell 224 coupled to the light pipe 221 of the concentric arrangement couples an electrical signal corresponding to the varying light intensity in the light pipe 221 to the space recognizing circuit 239. The space recognizing circuit 239 is similar to the circuit 39 described above in reference to FIGURES 1 and 2 but the output pulse provided therefrom is of shorter duration. With a space being scanned in 0.1 second, the circuit 239 determines that it is a blank space and not a symbol which is being scanned in 0.06 second which is 0.01 second longer than ½ the space scanning duration. The output pulse to the read-out control 250 from the space recognizing circuit 239 is 0.04 second's duration and the read-out sequence under control of the read-out control 250 is completed during the 0.04 second interval until the end of the recognized space.

The read-out sequence with respect to the 4 cylinder concentric arrangement is similar to that described above in reference to FIGURES 1 and 2 except that the return movements are completed during the shorter interval of 0.04 second and the read sequence is initiated for each space including the second, third, etc. following a word. The frequency of the signals generated by coupling the light spots through the sound tracks is considerably higher than those developed by the slow return movement of the embodiment shown in FIGURES 1 and 2. As is hereinafter described, the relatively high frequency audio signals are time expanded to convert them to a lower frequency similar to speech. The transparent sound tracks may illustratively provide for frequencies which are ten times the required frequencies which are to be introduced to the speaker 256. The sound tracks in the embodiment of FIGURE 8 may actually be identical to the sound tracks in the embodiment in FIGURES 1 and 2 with the greater return speed being greater by a factor of 10 to provide for the higher frequency signals.

The read-out signals from the photocell 240 are coupled through the gate 251 which is enabled by the space recognizing circuit 239 to the threshold amplifier 252. The amplifier 252 is automatically adjusted by the control circuit 252*a* which is synchronized with the cylinders 223 and 224. The separated signals representing the scanned word from the amplifier 252 are coupled through an amplifier 255 to five normally inhibited gates 271 through 275. The gates 271 through 275 are part of an arrangement for extending the duration of the signals from the amplifier 255 thereby to reduce the frequencies to the required value. Though only five gates 271 through 275 have been depicted, it will be apparent that any number can be utilized. The gates 271 through 275 are successively enabled under control of a ring counter 270. The ring counter 270 is, in turn, controlled by the space recognizing circuit 239. Each time a space following a printed word is scanned, the circuit 239 steps the ring counter 270. The stepping pulse is coupled from the circuit 239 through the gate 261. The circuit 239 also sets the flip-flop circuit 260 which inhibits the gate 261 to block the passage of succeeding pulses from the space recognizing circuit 239.

When the next printed letter is scanned, the space recognizing circuit 239 resets the flip-flop circuit 260 to return the gate 261 to normal. The reset potential from the flip-flop circuit 260 is supplied from the timing circuit, not shown, in FIGURE 8, which is included as part of the space recognizing circuit 239.

In this manner, as the ring counter 270 is cyclically operated the gates 271 through 275 are successively enabled to couple the successive word signals from the amplifier 255 to five recording heads 281 through 285. The heads 281 through 285 are rotated at a predetermined speed by a motor 299 adjacent a magnetic tape 280. The magnetic tape 280 is moved in a circular path about the rotating heads 281 through 285 so that the signals from the amplifier 255 are recorded as five tracks on the magnetic tape 280. The magnetic tape is maintained in a substantially 360 degree turn about the rotating heads 281 through 285 by means of guides 287. The gates 271 through 275 may be respectively connected to the heads 281 through 285 by slip rings, not shown. The five track tape 280 moves from the guides 287 to another set of five rotating heads 291 through 295 driven by a motor 298. The tape moves through guides 288 in a substantially 360 degree path about the rotating heads 291 through 295. The heads 291 through 295 are rotated at a speed which is slower than the rotating speed of the heads 281 through 285 by a factor of 10. When viewed from the top in FIGURE 8 with the direction of movement of the tape 280 being indicated by the arrows, the heads 281 through 285 may be rotated in a counterclockwise direction and the heads 291 through 295 may be rotated in a clockwise direction.

The effect of the two sets of rotating heads is to extend the duration of the signals developed from the four cylinder concentric arrangement and to reduce, correspondingly, their frequencies to the specific frequencies corresponding to the spoken word. The signals from the rotating heads 291 through 295 are coupled through slip rings, not shown, to an amplifier 289. The amplifier 289 introduces the audio signals to a speaker 256 which converts the signals to audible sounds for the listener.

Figure 5:
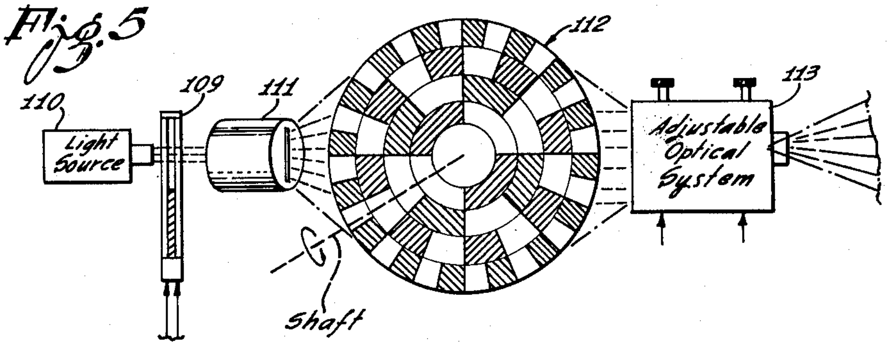
FIGURE 5 is a diagrammatic representation of a portion of a third embodiment of this invention in which a flicker frequency scanning beam is utilized.

In the embodiments shown in FIGURES 1 and 2, and also in FIGURE 8, the color components of the beam or light are modulated in accordance with the scanned word to determine the address of the word being scanned in the word dictionary. In the embodiment shown in FIGURE 5, the colors of the beam are not utilized but instead a flicker modulator ring 112, shown enlarged in FIGURE 5, is utilized to modulate the beam of light coupled to the optical system 113. The components shown in FIGURE 5, except for the modulator ring 112, are similar to corresponding components of FIGURE 1 and have similar reference numerals with the addition of 100. The source 110, for example, in FIGURE 5 is similar to the source 10 in FIGURE 1.

The ring 112 which modulates the light through the lens system 111 includes a number of tracks or rings each of which has alternate transparent and opaque sections. The slit 111*a* in the lens system 111 provides a ribbon of light having a height which is substantially equal to the radius of the ring 112. The various portions of the ribbon beam are, in this manner, modulated in accordance with one of the coded rings on the modulator disc 112. When, as illustrated in FIGURE 5, four rings are utilized, the ribbon beam is modulated in four different sections, each of which is at a different frequency. The four modulated portions of the ribbon beam are coupled from the optical system 113 to the page which is to be scanned. The rest of the system may be similar to that illustrated in FIGURES 1 and 2. The reflected light is provided the light pipe 21 to determine the address of the word being scanned. The light in the pipe 121 consists essentially of three separate components each varying at a particular frequency and each being modulated in accordance with the portion of the words across which it passes. The flicker frequency provided by the modulated disc 112 functions, therefore, as a carrier for the modulation by the printed matter on the scanned page. The optical filters in the word dictionary have characteristics to discriminate against the different instantaneous frequencies to determine the address of the word being scanned.

The flicker frequency modulation of the beam may be utilized in combination with the color spectrum beam or separately as shown in FIGURE 5. Instead of flicker frequency or color for the scanning beams, different polarization angle bands of light may be utilized with the optical filters of the dictionary having corresponding characteristics.

Figure 3:
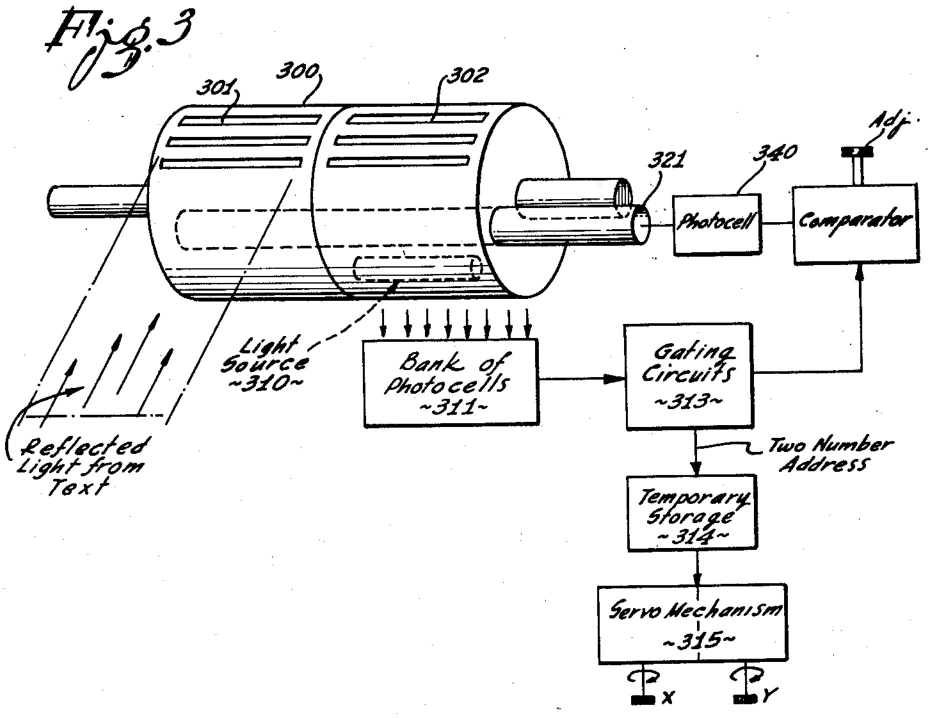
FIGURE 3 is a functional representation of a print reader utilized in a second embodiment of this invention in which an unmodulated white light scanning beam is utilized.

The various embodiments described above are of integrated design in that the text is scanned and audio signals are provided with both scanning and read-out sequences being performed in one arrangement. In the embodiment of the invention illustrated in FIGURES 3 and 4, the word address is determined by a print reader depicted in FIGURE 3 and the audible sounds are provided by an enunciator depicted in FIGURE 4. The output of the print reader is digital information which may be in the form of two shaft positions to identify the scanned word. The reflected light from a word of the printed text is coupled to a rotating drum or belt 300. The drum 300 includes optical filter elements 301 arranged to successively interrupt the reflected light as the drum 300 is rotated. The light through the optical elements 301 is received by a light pipe 321 which introduces the successively received light to a photocell 340. The electrical signals from the photocell 340 are introduced to a comparator or threshold circuit 352 which responds only to signals having magnitudes over a predetermined value. Only one of the filter elements 301 transmits sufficient light to operate the comparator 352.

When the comparator 352 operates, it enables a plurality of gating circuits 313 to read-out the address of the scanned word. The drum 300 functions effectively as a translator including the optical filter elements 301 and a plurality of coded optical elements 302 associated individually with the elements 301. As the drum 300 is rotated, a light source 310 successively illuminates the coded elements 302 to selectively energize a bank of photocells 311. Each of the coded elements 302 provides for a unique combination of operated photocells 311. The address of the scanned word may illustratively be in the form of two binary numbers each having 11 digits, so that 22 photocells are included in the bank of photocells 311. When the gating circuits 313 are enabled, the photocells 311 couple an indication of their operation to a temporary storage device 314 which operates a servo-mechanism 315. The output of the servo-mechanism 315 is in the form of two shaft positions designated X and Y in FIGURE 3. The servo-mechanism 315 may include conventional digital to shaft position converters, not shown.

Figure 4:
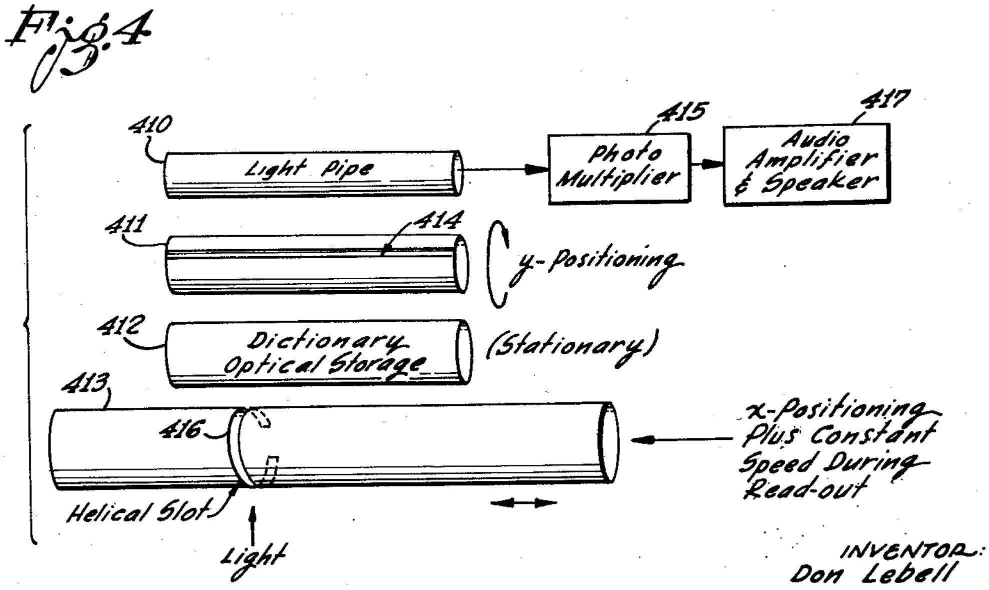
FIGURE 4 is a diagrammatic representation of an enunciator utilized in the second embodiment of this invention.

The two shaft positions are utilized as an input for the enunciator which is shown in FIGURE 4. The X shaft position is utilized to longitudinally position the outer cylinder 413 of a four concentric cylinder arrangement. The four concentric cylinders are the outer cylinder 413 which includes a single helical slot 416, a dictionary optical storage cylinder 412 which includes sound tracks, not shown, a cylinder 411 which includes a single longitudinal slot 414 and an internal light pipe 410. The two shaft positions are utilized to position respectively the cylinders 413 and 411. The cylinder 411 is positioned at a particular angle in accordance with the binary shaft position Y, and the cylinder 413 is longitudinally positioned in accordance with the shaft position X.

Thereafter, the cylinder 413 is rotated so that the thin helical slot 416 successively transmits light to different positions of a number of sound tracks on the dictionary storage 412. Light is transmitted through only one of the sound tracks as determined by the angular position on slit 414 of the cylinder 411. The light which as indicated by the arrow is provided by means, not shown, which surrounds the outer cylinder 413. The light, therefore, passes through the helical slot 416, one of the sound tracks of the storage 412 and through the slot 414 to the light pipe 410. The light received at the light pipe 410 is, in this manner, modulated in accordance with the transmission characteristics of the selected sound track of the dictionary storage 412. The particular sound track is selected, in this manner, in accordance with the two input binary numbers which may be in the form of the two shaft positions X and Y. The output of the light pipe 410 is coupled through a photo-multiplier 415 for introduction to an audio channel 417 including an audio amplifier and a separator. A threshold responsive device is not required because light is transmitted through a single sound track.

Although this application has been disclosed and illustrated with reference to particular applications, the principles involved are susceptible of numerous other applications which will be apparent to persons skilled in the art. For example, the various dimensions and timing sequences are merely illustrative. The invention is, therefore, to be limited only as indicated by the scope of the appended claims.

I claim:

1. A data converter for converting printed text to audio electrical signals representing speech, including, means for developing a ribbon beam of light consisting of a number of color bands, means coupled to said developing means for scanning the printed text printed line by printed line with the ribbon beam of color bands from said developing means whereby the reflected color bands from the scanned printed lines are modulated in accordance with the printed symbols of the lines, a plurality of optical filters optically coupled to said scanning means for simultaneously receiving the modulated light from the scanned lines, and means synchronized with said scanning means for simultaneously scanning each of said optical filters whereby the light transmitted through each of said filters is determined both by the characteristics of said filter and by the modulated light.

2. Reading apparatus for converting printed text to audio electrical signals representing speech, including, means for developing a ribbon beam of light consisting of a number of color bands, means coupled to said developing means for scanning the printed text printed line by printed line with the ribbon beam of color bands from said developing means whereby the reflected color bands from the scanned printed lines are modulated in accordance with the printed symbols of the lines, a plurality of optical filters optically coupled to said scanning means for simultaneously receiving the modulated light from the scanned lines, means synchronized with said scanning means for simultaneously scanning each of said optical filters whereby the light transmitted through each of said filters is determined both by the characteristics of said filter and by the modulated light, means coupled to said simultaneous scanning means for identifying the optical filter through which a maximum amount of the modulated light is coupled, and means coupled to said identifying means for generating a unique audio electrical signal associated with said identified filter.

3. Reading apparatus for converting printed information to speech, including means for simultaneous scanning different portions of the printed information with different kinds of scanning light, means optically coupled to the printed information for combining the different kinds of scanning light, each modulated differently by the printed information, a reference source of information, and means coupled to said combining means for comparing the information from the reference source with the printed information in the form of the combined light from said combining means to identify particular information being scanned.

4. Reading apparatus for converting printed information to speech, including means for simultaneously scanning different portions of the printed information with different scanning light, means optically coupled to the printed information for combining the different scanning light, each modulated differently by the printed information, a reference source of information, means coupled to said combining means for comparing the information from the reference source with the printed information in the form of the combined light from said combining means to identify particular information being scanned, and means coupled to said identifying means for generating speech corresponding to said identified information.

5. Reading apparatus for converting printed text to audio electrical signals representing speech, including, means for developing a ribbon beam of light consisting of a number of color bands, means coupled to said developing means for scanning the printed text printed line by printed line with the ribbon beam of color bands from said developing means whereby the reflected color bands from the scanned printed lines are modulated in accordance with the printed symbols of the lines, means optically coupled to the printed text for receiving and diffusing the modulated color band of the ribbon beam of light to produce a changing color light wave having an instantaneous color resulting from the combination of the instantaneous magnitudes of the modulated color bands, a plurality of color identifying areas optically coupled to said receiving and diffusing means to which the changing color light wave is provided, said color identifying areas being individually associated with particular portions of the printed text, and means synchronized with said scanning means for simultaneously scanning each of said areas for developing a signal identifying the particular one of said areas which is associated with the portion of the printed text being scanned with the ribbon beam of light by said printed text scanning means.

6. Reading apparatus for converting printed text to audio electrical signals representing speech in accordance with claim 5 wherein said simultaneous scanning means includes means for scanning each of said areas and for storing signals indicating the total amount of light successively coupled from each of said areas, a plurality of sound tracks individually associated with said areas, and means coupled to said scanning and storing means for generating audio signals from each of said sound tracks having magnitudes relating to the stored signals.

7. Reading apparatus for converting printed text to audio electrical signals representing speech in accordance with claim 6 wherein said simultaneous scanning means also includes threshold responsive means coupled to said generating means for amplifying only the audio signals generated from the sound track associated with the portion of the printed text being read.

8. Reading apparatus for converting printed text to audio electrical signals representing speech in accordance with claim 7 wherein said threshold responsive means is adjustable, and means are included in the reading apparatus which is synchronized with said scanning and storing means for automatically adjusting said threshold responsive means in accordance with the length of the portion of the printed text being read.

9. Photoelectric apparatus for reading printed text, including, a word dictionary having means for identifying the particular words utilized in the printed text, means for scanning the printed text and for providing the scanning information in the form of modulated light to said identifying means in the word dictionary, means synchronized with said scanning means for scanning said identifying means of said word dictionary to develop a signal having a particular position relative to the position of said identifying means which particular position identifies the word being scanned, and means including photoelectric means optically coupled to the identifying positions for developing an audio signal corresponding to the printed word being read.

10. Photoelectric reading apparatus for different kinds of printed information, each of which includes different words, type of print and dimensions of words and between letters and words, including, a replaceable word dictionary corresponding to a particular kind of printed information having light responsive means for identifying light modulated in accordance with different words of the particular kind of printed information, means for successively scanning the words of the particular kind of printed information and developing light modulated in accordance therewith, and means coupled to said scanning means for successively providing the modulated light from said scanning means to said light responsive means of said word dictionary.

11. Photoelectric reading apparatus for reading information in the form of printed words, including, means for successively scanning the printed words and for developing modulated light beams in accordance therewith, a word dictionary including an input and an output element for each printed word, each of the input and output elements having different optical characteristics, means coupled to said word dictionary for determining the identity of the printed word being scanned by comparing the modulated light beams with each of the input elements of said word dictionary, and means coupled to said input elements for developing output signals from the output element associated with the identified printed word.

12. Photoelectric reading apparatus in accordance with claim 11 wherein each of the input elements of said word dictionary is an optical filter and said comparing means includes means for successively positioning the optical filters in the modulated beams for transmitting light having an intensity determined by the match between the modulation of each light beam and the characteristics of the optical filters.

13. Photoelectric reading apparatus in accordance with claim 12 wherein said developing includes a light collector for receiving the successively transmitted light from the optical filters, and a threshold responsive device for providing an indication when a match occurs between the modulation of a modulated beam and the characteristics of the optical filters.

14. Reading apparatus for converting printed information to speech, including, means for simultaneously scanning different portions of the printed information with different kinds of scanning light in the form of different wavelengths, means optically coupled to the printed information for combining the different kinds of scanning light, each modulated differently by the printed information, a reference source of information, and means coupled to said combining means for comparing the information from the reference source with the printed information in the form of the combined light from said combining means to identify particular information being scanned.

15. An enunciator for converting a signal representing a word address to audible sounds representing the word as spoken, including, a member having a plurality of optical filter elements corresponding to the words of a dictionary and each having a unique word address on the member, each of the filter elements including a number of transparent portions having different transmission coefficients, means optically coupled to said member and responsive to the signal representing a word address for successively illuminating the portions of optical filter element indicated by the word address, means coupled to the optical filter elements for receiving the light successively transmitted through the portions of the optical filter element indicated by the word address of the signal, and means coupled to said receiving means for converting the received light to audible sounds representing the word indicated by the word address of the signal.

16. A data converter for converting visible information to electrical signals representing the visible information, including, means for simultaneously scanning different portions of the visible information with light beams having different characteristics to develop a modulated beam representing each of the simultaneously scanned different portions of the visible information, means coupled to said scanning means for mixing the modulated beams from said scanning means to develop a modulated light signal representing successively scanned portions of the visible information, light receiving means coupled to said mixing means and synchronized with said scanning means for identifying the successively scanned portions of the visible information, and means coupled to said identifying means for generating an electrical signal representing each successively identified portion of the visible information.

17. A data converter for recognizing any one of a large number of different input signal patterns, including, means for providing light having particular characteristics relating to the input signal patterns, a dictionary having a large number of different optical filters associated individually with the input signal patterns to be recognized, means for coupling the light from said providing means to each of the optical filters of said dictionary, and means for simultaneously scanning said optical filters during the time the light is coupled to said optical filters by said providing means to determine the magnitude of light from each of said optical filters.

18. A data converter for recognizing any one of a large number of different input signal patterns, including, means for providing light having particular characteristics relating to the input signal patterns, a dictionary having a large number of different optical filters associated individually with the input signal patterns to be recognized, means for coupling the light from said providing means to each of the optical filters of said dictionary, means for simultaneously scanning said optical filters during the time the light is coupled to said optical filters by said providing means to determine the magnitude of light from each of said optical filters, and to provide a signal in accordance therewith, and means coupled to said scanning means for detecting the signal from said scanning means representing the optical filter providing the largest magnitude of light, and means coupled to said detecting means for providing a signal identifying the optical filter providing the largest magnitude of light.

References Cited in the file of this patent

UNITED STATES PATENTS 2,615,992 Florey et al. ............ Oct. 28, 1952
2,616,983 Zworykin ............... Nov. 4, 1952

OTHER REFERENCES

Letter Reading Machine, Electronics, June 1949.